United States Patent

Ireland, Jr. et al.

[11] 3,911,066
[45] Oct. 7, 1975

[54] SCRUBBER CONTACT ELEMENTS

[75] Inventors: Roy D. Ireland, Jr.; Francis E. Dahlem, both of Louisville, Ky.

[73] Assignee: American Air Filter Company, Inc., Louisville, Ky.

[22] Filed: Nov. 9, 1973

[21] Appl. No.: 414,190

[52] U.S. Cl. .................. 261/94; 55/91; 55/512
[51] Int. Cl. ............................................ B01d 47/14
[58] Field of Search ............... 261/DIG. 72, 94–98; 55/91, 230, 231, 90; 273/58 A

[56] References Cited
UNITED STATES PATENTS

| | | | |
|---|---|---|---|
| 1,262,532 | 4/1918 | McElroy | 273/58 A |
| 3,122,594 | 2/1964 | Kielback | 55/90 X |
| 3,293,174 | 12/1966 | Robjohns | 261/94 UX |
| 3,350,075 | 10/1967 | Douglas | 55/91 X |
| 3,410,057 | 11/1968 | Lerner | 261/94 X |
| 3,768,234 | 10/1973 | Hardison | 55/91 UX |
| 3,796,657 | 3/1974 | Pretorius et al. | 261/94 |

FOREIGN PATENTS OR APPLICATIONS

| | | | |
|---|---|---|---|
| 1,235,414 | 6/1971 | United Kingdom | 55/91 |
| 666,990 | 7/1965 | Belgium | 210/DIG. 21 |

Primary Examiner—Bernard Nozick

[57] ABSTRACT

Contact elements, for use in a mobile bed scrubber, comprised of polymeric resinous materials with a specific density range, a specific compressive strength range, and other specific physical properties are disclosed, which, when used in such a mobile bed scrubber in a continuously moving bed have a useful life of greater than 8,000 hours, based upon an acceptable decrease in surface area of about 45%. Such a useful life is far greater than the useful life of similar contact elements not having the above mentioned physical properties within the desired ranges recited.

4 Claims, 1 Drawing Figure

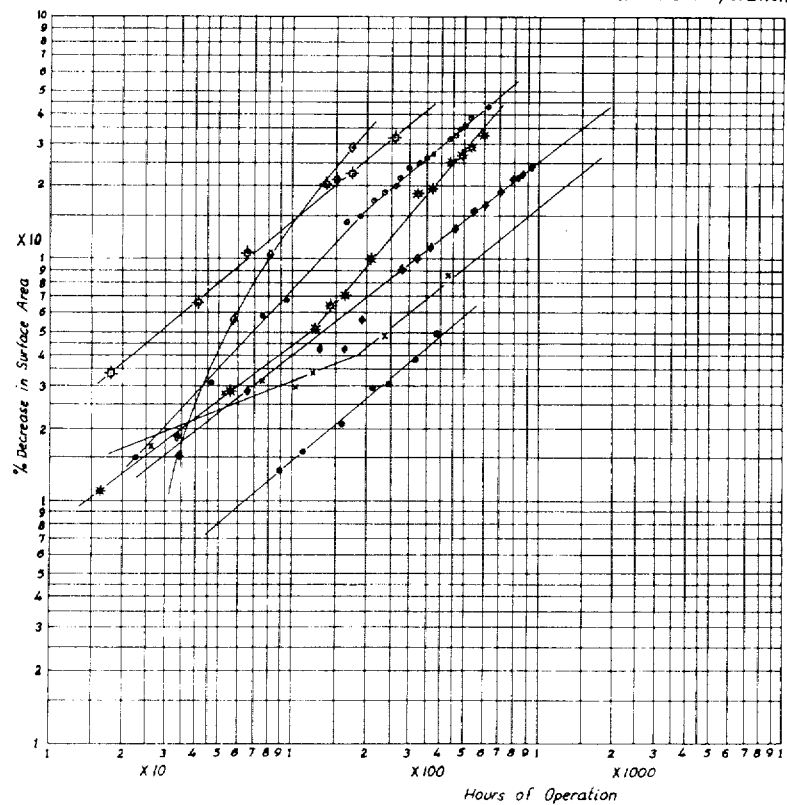

Contact Element Life-Accelerated Test
% Decrease in Surface Area v. Hours of Operation Legend

| Curve | Symbol | Description |
|---|---|---|
| 1 | ● | Hollow Polypropylene Spheres |
| 2 | × | Foamed VS stock PVC Spheres w/10 mil PVC Coating |
| 3 | ◆ | Foamed VS stock PVC Spheres (w/skin) |
| 4 | ✲ | Foamed "M" stock PVC Spheres |
| 5 | ⊚ | Foamed "M" stock PVC Spheres w/modified skin thickness |
| 6 | ⬥ | Foamed Polypropylene Spheres without skin |
| 7 | ◇ | Foamed "H" stock PVC Spheres (w/skin) |

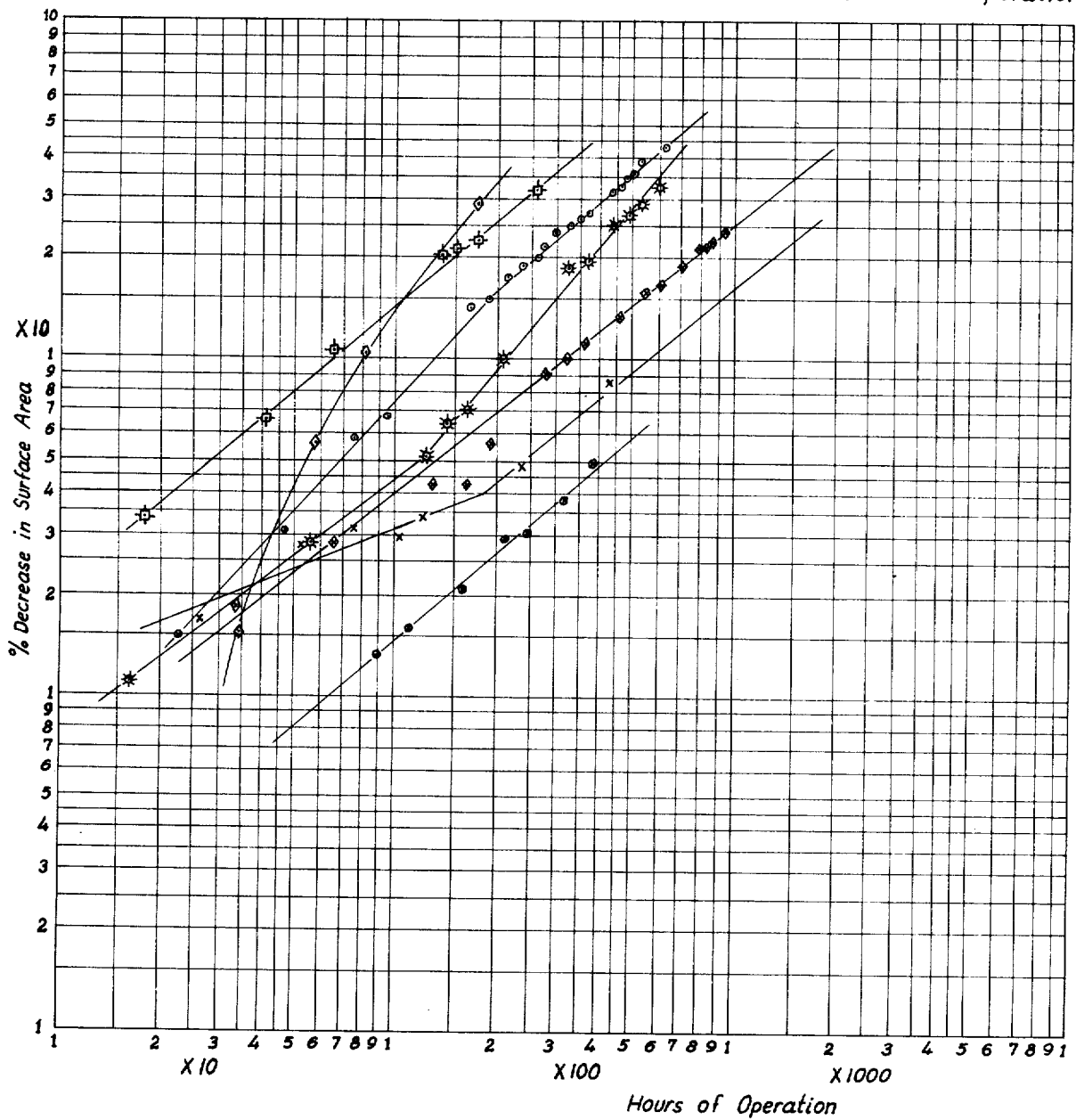

Fig. 1 Contact Element Life-Accelerated Test
% Decrease in Surface Area v. Hours of Operation Legend

| Curve | Symbol | Description |
|---|---|---|
| 1 | ⊗ | Hollow Polypropylene Spheres |
| 2 | × | Foamed VS stock PVC Spheres w/10 mil PVC Coating |
| 3 | ◈ | Foamed VS stock PVC Spheres (w/skin) |
| 4 | ☼ | Foamed "M" stock PVC Spheres |
| 5 | ⊙ | Foamed "M" stock PVC Spheres w/modified skin thickness |
| 6 | ✚ | Foamed Polypropylene Spheres without skin |
| 7 | ◇ | Foamed "H" stock PVC Spheres (w/skin) |

SCRUBBER CONTACT ELEMENTS

BACKGROUND OF THE INVENTION

There are known contacting devices used for contacting liquids and gases. Such devices include packed towers of both the stationary and mobile bed type. The mobile bed variety have received considerable attention since mobile beds tend to overcome the problem of bed channeling which occurs in stationary beds. Mobile beds also are comprised of moving contact elements which resist becoming cemented together when the contact of the liquid and gas results in a cement-like chemical product (for example, contacting calcium hydroxide solution with gases containing sulfur dioxide results in the formation of calcium sulfate which is a cement-like material when hardened). However, mobile bed towers suffer from the serious defect that the contact elements used therein are constantly abrading against each other and the sidewalls of the tower with a resultant high wear rate on these elements. The invention of this disclosure, however, overcomes the wear rate problem of the contact elements and enables the mobile bed type contact towers to be run for long periods of time without undue wear of the contact elements.

SUMMARY OF THE INVENTION

The invention comprises new and novel contact elements for use in mobile bed type fluid contacting towers operating with two or more fluids being brought into contact in either co-current or countercurrent flow. The contact elements allow the scrubbers to be operated for longer time periods without interruption than scrubbers having conventional contact elements. These longer periods of continuous operation are possible because of the tremendously increased wear resistance of the contact elements of the invention. More specifically, the invention comprises a substantially spherical fluid contact element for use in a mobile bed contact tower arrangement suitable for the contact of fluids flowing in either a co-current or countercurrent direction with respect to each other, said contact element comprising a closed cell foamed polymeric resinous material having a density in the range of between about 10 pounds per cubic foot and about 20 pounds per cubic foot, a compressive strength in the range of between about 1 psi and 8 psi, a wear resistance of greater than 8,000 hours based upon an acceptable decrease in surface area of about 45% and an energy absorption coefficient, expressed as percent of static rebound, in the range of between about 30 and about 75%. The contact elements of this invention have been found to have a greatly prolonged useful life in a mobile bed type contacting arrangement thereby allowing for the continuous uninterrupted operation of such a contact tower without the need for maintenance or service, thus, resulting in lower operation costs for such contact towers and thus making them economically feasible for air purification.

DESCRIPTION OF THE PREFERRED EMBODIMENT

The preferred polymeric resinous material for fabrication of the contact element of this invention is defined by various physical properties. Several test methods were used to define these properties and evaluate various materials to determine the suitability of each for use as a contact element in a mobile bed. The following is a summary of each of the test methods used. The materials evaluated included, specifically, hollow propylene balls, closed cell vinyl foam balls both coated and uncoated, and closed polypropylene foam balls. The test procedures were as follows:

a. compressive strength specimens taken from contact elements were tested for compression strength by measuring the weight required to deflect them 25%. The basic procedure followed in determining the compressive strength is outlined in ASTM D–1667–64. The test specimens were prepared in accordance with this ASTM method. Basically, the specimens are positioned below a flat indentor foot. Weights are then added to a suitable platform attached to said indentor foot and the weight required to deflect the specimen to 25% of its original height is recorded. The apparatus used for this test consisted of a flat indentor foot 1 ½ inches in diameter attached to a shaft 1 ¼ inches in diameter and 14 inches in length which shaft had on its opposite end a flat plate 6 by 6 inches in area and 14 gauge in thickness. The indentor shaft section was placed and held in a vertical plant by a fixed support arm having a carbon filled bronze bushing of sufficient inside diameter to surround the shaft to minimize friction during the test. The flat plate fixed to the top of the tubing was thus maintained in a horizontal plane and was used for a platform to support known weights used for compressing the tests specimen. All weights were centered over the connecting shaft to minimize the frictional effects during the tests.

b. pore size measurement

Pore size measurements were made on the closed cell foam material being evaluated for mobile bed contact elements. These specimens for pore size measurement were obtained from molded spherical contact elements by first freezing the sphere and then cutting a circular cross section approximately 1/16 inch to ⅛ inch thick through the center of the sphere. These specimens were placed on the stage of a binocular microscope and viewed under 35 power magnification through a Filar micrometer eye piece. The sample was normally illuminated by a light source located above the stage and directed toward the stage. In the alternative, some of the samples were illuminated by locating the light source below the stage and directing light toward the sample. Measurements of the pore size were made by measuring the maximum and minimum dimensions of a representative sample of the pores. Measurements were made of selected pores along a diameter of the circular cross section of the spherical contact element specimen.

c. density measurement

The density of the contact elements were determined by measuring the diameter of a contact element and determining the weight of the same contact element. Density measurements were made on a sample of 10 contact elements of each proposed material of fabrication. Diameter measurements were made with a micrometer accurate to plus or minus 0.0001 inches. Contact element weights were measured on a gramatic balance, acurate to plus or minus 0.001 grams. Reported density measurements are based on the average weight and diameter of each type contact element.

d. accelerated dry wear tests

Each contact element was subjected to an accelerated wear test in a dry environment. The purpose of this test was to determine the relative wear rate of contact elements fabricated from various polymeric resinous materials under similar tests conditions. The accelerated dry wear test device consisted of a cylinder 15 inches in diameter and 15 inches in height mounted on a conical base. Inside the lower end of the cylinder a motor driven rotating base plate was installed. The base plate rotated at a constant speed of 90 revolutions per minute. This base plate consisted of a fan wheel which was mounted with the upstream side located on the bottom when viewed in its horizontal position. The upstream side was in flow communication with a Buffalo Forge fan, model 3RE, equipped with wheel W164 located below the cylinder. Air was inducted into the inlet of the Buffalo Forge fan and discharged into the inlet of the fan wheel base plate and then discharged radially inside the cylinder around the periphery of the fan wheel. The top end of the vertically mounted cylinder was covered with an expanded plastic sheet having an open area greater than 80% to discharge air but retain the spherical packing materials within the test unit. The inside circumference of the cylinder and the top side of the rotating base plate were covered with an abrasive alumina oxide paper 220–J grit. This abrasive paper was replaced prior to initiating testing of each new sample of contact elements. The total time that the contact elements were exposed to these accelerated wear conditions was recorded with an electric timer which was energized only when the driving motor of the rotating base plate was in operation.

e. prototype mobile bed scrubber wear tests

The purpose of this test was to determine the useful life of contact elements when subjected to anticipated operating conditions of a mobile bed scrubber. The scrubber employed was similar to the scrubber arrangement described and claimed in U.S. Pat. application No. 216,169, filed Jan. 7, 1972 by Thomas W. Byers, Francis E. Dahlem, Roy D. Ireland, Jr. and Mohiuddin Pasha. Air at ambient conditions was directed upward through the scrubber fluidizing the bed of contact elements. As the individual elements traveled upwards through the scrubbing zone they were contacted by droplets of a slurry composed of 4% by weight fly ash, 6% by weight gypsum, and 90% by weight water. These droplets were sprayed into the countercurrent air stream at an angle of 45° from vertical. The ratio of the slurry flow rate to the air flow rate was maintained essentially constant throughout the test period. The actual wear of the contact elements was determined over an extended period of time. The amount of wear experienced by the contact elements was determined by measuring the diameter of a representative number of spherical contact elements withdrawn from the bed undergoing testing. A decrease in the average diameter of the spherical contact elements was used to compute the reduction in surface area over the test period. Diameter measurements were made with a micrometer accurate to ±0.0001 inches. The results of these wear tests were correlated with the results from the accelerated wear tests described above. The data shows that one hour of accelerated wear life is the equivalent of ten hours of scrubber wear.

f. energy absorption tests

Tests were conducted on various closed cell foamed materials to determine their energy absorption characteristics. A static test was performed in accordance with procedures detailed in the United States Department of Defense military specification MIL–P–12140B. The test basically consisted of dropping a steel ball of known weight onto a flat sheet of the material to be tested. A kinetic test was performed with the mold spheres or contact elements of the different materials. The kinetic test consisted of dropping the molded contact elements from a fixed height onto a known solid surface and measuring the rebound height of each sample. The molded balls used in these tests were nominal 1¾ inch diameter contact elements. The nominal densities of the materials tested are noted in the summary Table IV.

The following tables summarize the data from the various previously described tests.

TABLE I

COMPRESSION TEST DATA

| Stock | Avg Cylinder Cross-Section Area, $IN^2$ | Wt. to compress cylinder height 25% LBS | Compressive strength, psi |
|---|---|---|---|
| S  | .985822 $IN^2$ | 5.069 LBS    | 5.142 psi  |
| VS | .976341 $IN^2$ | 4.84854 LBS  | 4.966 psi  |
| M  | .963511 $IN^2$ | 11.352072 LBS| 11.782 psi |
| H  | .944038 $IN^2$ | 23.708113 LBS| 25.114 psi |

Pore size measurements of the respective samples were made in accordance with the previously described pore size measurement tests procedures. The following results were recorded in Table II.

TABLE II

| Stock | Pore Dimensions Avg Size | PORE SIZE Range | Skin Thickness (Avg) |
|---|---|---|---|
| H | $95.68 \times 10^{-6}$ in | $52.1–114.5 \times 10^{-6}$ in | $36.6 \times 10^{-6}$ in |
| Remarks: | Thin skin - larger layer of cells under skin very small cell in center. | | |
| M | $86.94 \times 10^{-6}$ in | $26.0–207.3 \times 10^{-6}$ in | $17.57 \times 10^{-6}$ in |
| Remarks: | Small elongated pore next to skin. Large irregular shaped cell next layer-center had uniform size and shape cells. | | |
| S | $54.7 \times 10^{-6}$ in | $22.1–112.7 \times 10^{-6}$ in | $27.3 \times 10^{-6}$ in |
| Remarks: | Uniform outer skin next thin layer of tiny cells - next very large cells center had smaller cells then surrounding. | | |
| VS | $70.86 \times 10^{-6}$ in | $24.6–146.2 \times 10^{-6}$ in | $30.1 \times 10^{-6}$ in |
| Remarks: | Thin skin - thick layer of tiny cells-then large cells constituting rest of cross section. | | |

The density of the contact elements was determined in accordance with the previously described density tests. The results were recorded in the following Table III.

TABLE III

DENSITY OF CONTACT ELEMENTS

| Stock | Nominal Diameter | Density of Molded Element [lbs./ft³] |
|---|---|---|
| H | 2 in. | 6.24 |
|  | 2 in. | 8.22 |
| M | 1½ in. | 12.42 |
|  | 1½ in. | 13.96 |
| S | 1¾ in. | 12.31 |
| VS | 1¾ in. | 14.16 |
| Hollow Polypropylene Ball | 1¾ in. | 10.61 |
| Foamed Polypropylene | 1½ in. | 3.68 |

In further definition of the properties of closed cell polymeric resinous foamed materials which are suitable alone as contact elements or as inner matrix structures to be coated with polypropylene or other materials for contact elements energy absorption tests were run in accordance with the previously described test procedures. The results of such energy absorption test are shown in the following Table IV.

TABLE IV

ENERGY ABSORPTION TESTS OF CONTACT ELEMENTS

A. Kinetic test conducted at 74°F per Military Specification, MIL-P-12420B. (Test involves dropping steel ball of known weight on test sample)

| Material tested | Inches rebound | % Static Rebound |
|---|---|---|
| H stock | 8 1/2 | 28.3 |
| M stock | 6 15/16 | 23.1 |
| S stock | 10 7/8 | 36.3 |
| VS stock | 15 | 50.0 |

B. Static test conducted at 71°F. Test consists of dropping a contact element from constant height and measuring rebound.

| Material Tested | Nominal Density, LBS/FT³ | Rebound, cm | % Kinetic Rebound |
|---|---|---|---|
| vinyl foam H stock | 8.2 | 23 | 29.5 |
| vinyl foam M stock | 12.5 | 17 | 21.8 |
| vinyl foam S stock | 12.3 | 17 | 21.8 |
| vinyl foam VS stock | 14.2 | 15.5 | 19.9 |
| Hollow polypropylene | 10.6 | 54 | 69.2 |

The wear resistance of various closed cell foamed contact elements both coated and uncoated are shown on the graph of FIG. 1. It was determined that one hour of operation in the dry test apparatus is equivalent to 10 hours of operation in a mobile bed scrubber under standard operating conditions. On that basis, it should be noted that various foamed polymeric resinous materials used as contact elements and tested in the accelerated dry wear tests failed to meet the objective of 8,000 hours continuous performance with less than about 45% decrease in surface area and less than about a 25% decrease in diameter. The hollow polypropylene spheres appeared to meet the requirements; however, after 400 hours of operation their sidewalls became so thin that they began to disintegrate upon further testing. Thus, they were excluded as suitable contact elements. The most suitable contact elements were comprised of closed cell foamed VS stock polyvinylchloride (PVC) spheres with a 10 mil coating of non-foamed PVC. The contact elements had a projected life which would easily meet the requirements of 8,000 hours of continuous operation. The second most preferred contact elements comprise foamed closed cell VS stock PVC spheres with a skin which resulted from the molding operation of the spheres. The skin was in the range of between 2 and 20 mils in thickness. The third most preferred contact elements were fabricated from closed cell foamed M and S stock PVC spheres. The remaining foamed closed cell polymeric resinous materials were dismissed as viable candidates for the fabrication of contact elements in a mobile bed scrubber.

From the observations of the data in FIG. 1, it was then possible to refer to the tables of physical properties of the various contact elements recited in this specification in Tables I through IV and define acceptable foamed polymer resinous materials in terms of ranges of their physical properties which would be suitable for the fabrication of contact elements. The result was that it was determined that the polymeric resinous material should be closed cell and have a density in the range of between about 10 pounds per cubic foot and about 20 pounds per cubic foot. A compressive strength in the range of between about 1 and 8 psi; a wear resistance of greater than 8,000 hours based upon an acceptable decrease in surface area of about 45% and an energy absorption coefficient expressed as percent of static rebound in the range of between about 30 and about 75% as per MIL-P-12420B. Further it appears advantageous that the average pore size of the foamed material be less than about $90.0 \times 10^{-6}$ in. and also advantageous that there be some pores in the range of $20-30.0 \times 10^{-6}$ in. present in the material.

It is important to note that the reason the foamed material or matrix structure be of a closed cell type as opposed to being of an open cell type, is that, each of the cells in the foamed structure should be closed or complete so that liquid may not penetrate into and through the contact elements. Such penetration is undesirable since the contact elements would soon become saturated and thus have a density outside the density range for most efficient operation. The closed cell structure on the other hand, prevents absorption of liquid and thus prevents any appreciable change in density since even under the worst conditions only the outer layer of closed cells would be abraded and cell walls broken to define an incresed outer cell surface but not allow the penetration of liquid. If materials such as polyurethane foam which is known to be an open celled foam is used, the absorbed liquid contained therein prevents the contact element from being bouyed upwardly at normally encountered gas flow rates. Thus, although undue wear of the contact elements is avoided, the purpose of a mobile bed contactor is frustrated.

It is further important to note that the optimum contact element includes the use of a closed cell foamed polymeric resinous material coated with an approximately 10 mil thickness of non-foamed polypropylene. From the information supplied in FIG. 1, it appears that hollow polypropylene spheres were acceptable during the first hours of operation. The difficulty arises however, in that upon continued operation the sidewall of the hollow spheres becomes so thin that the contact elements develop holes in their sidewalls and the scrubbing fluid is thus allowed to enter and fill the contact element thus giving a density far in excess of the acceptable density and causing the elements to fall to the bottom of the scrubber and cease to function in an effective manner. The solution of providing thicker hollow polypropylene sphere sidewalls is unacceptable because the hollow spheres initially will then have a density which is outside the acceptable range. Thus, the spheres do not form a mobile bed at start-up. Advantageously, closed cell foamed polymeric material is coated with a 10 mil thickness of polypropylene to gain the advantages of both the toughness of polypropylene and the energy absorbing capacity of closed cell foamed materials. The result is an amazingly wear resistant contact element for use in mobile bed scrubbers. Although the exact reasons for such a long wearing mobile bed scrubber contact element are not fully understood, it is theorized, without intent to limit the scope of the present invention in any way, that the tough polypropylene skin resists nicks, scratches, and abrasions, yet transmits energy from its outer surface to the closed cell foamed material on the inside which foamed material forms a matrix of cell walls each of which in turn vibrates and absorbs and dissipates the energy so transmitted. Thus, kinetic energy imparted to a contact element by virtue of its abrading with a similar contact element or with the contact zone sidewalls is dissipated through vibrational motion of the inner closed cell walls. Thus, the closed cell foamed polymeric resinous material acts as an energy sink so that such kinetic energy is dissipated in the form of vibrational motion rather than in the form of degradation (i.e. the breaking of the cell walls on the outer surface of the contact element).

It should also be noted that although polypropylene is the most preferred coating material, other polymeric resinous materials can be used to coat closed cell foamed polymeric resinous cores. For example, it is acceptable to begin with a spherical core of closed cell foamed polymeric polyvinyl chloride and coat it with a layer of resinous polyvinyl chloride having a thickness in the range of between about 2 mils and about 200 mils to form a contact element. Such a contact element must of course, have the physical properties of density, compressive strength, wear resistance, energy absorption coefficient within the ranges set forth above as being critical to be acceptable as a contact element in a mobile bed scrubber. Without limiting the scope of the present invention, it is noted that other polymeric resinous materials which may be used as coating materials include, polyethylene (both high density and low density), polyamides, polyesters, polystyrene, the various polybutadienes and copolymers of any two or more of the above. Similarly, polymeric resinous materials suitable for use as a contact element either coated or uncoated, include polyethylene (both high density and low density), polyamides, polyesters, polystyrene, polyvinyl chloride, the various polybutadienes and copolymers of any two or more of the above.

It should further be noted that it may be possible to utilize an inner core material of open cell polymeric resinous material such as polyurethane foam provided the contact elements have the physical properties described above as being critical and further provided that the contact elements are not maintained in operation in the contactor for so long of a period of time that the outer coating completely wears away, since as explained earlier, the contact elements would then absorb fluid and have a density which would be too great for them to be buoyed up and function as a part of a mobile bed. Further it should be noted that the coating material could in some instances be other than polymeric resinous materials and rubbers. For example, it may be desirable to use a particularly inert polymeric resinous material such as teflon, under certain circumstances, as the coating material for the contact elements.

Having thus described the invention, what is claimed is:

1. An apparatus for providing contact between fluids which comprises: a flow-through housing having a dirty gas inlet at one end and a clean gas outlet at the opposite end defining a gas passageway therebetween;
    a first element restraining grid disposed across one extremity of said passageway;
    a plurality of spherical gas contact elements loosely disposed above said restraining grid, said contact elements being a closed cell foamed polymeric resinous material having a coating of non-foamed polymeric resinous material on the surface thereof, said coating of non-foamed polymeric resinous material being between 2 and 200 mils thickness, with a density in the range of between about 10 pounds per cubic foot and about 20 pounds per cubic foot, a compressive strength in the range of between about 1 psi and about 8 psi.

2. The contact element of claim 1 wherein said coating is comprised of polyvinyl chloride.

3. The contact element of claim 1 wherein said coating is comprised of polypropylene.

4. The contact element of claim 3 wherein said polypropylene coating is in the range of about 10 mils in thickness.

* * * * *